(12) United States Patent
Lin et al.

(10) Patent No.: US 11,388,115 B2
(45) Date of Patent: Jul. 12, 2022

(54) CIRCUIT WITHIN SWITCH AND METHOD FOR MANAGING MEMORY WITHIN SWITCH

(71) Applicant: Realtek Semiconductor Corp., HsinChu (TW)

(72) Inventors: Yung-Chang Lin, Hsinchu County (TW); Kuo-Cheng Lu, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 193 days.

(21) Appl. No.: 16/679,344

(22) Filed: Nov. 11, 2019

(65) Prior Publication Data
US 2020/0228468 A1    Jul. 16, 2020

(30) Foreign Application Priority Data
Jan. 16, 2019 (TW) ................... 108101627

(51) Int. Cl.
*H04L 49/9005* (2022.01)
*H04L 49/90* (2022.01)

(52) U.S. Cl.
CPC ...... *H04L 49/9005* (2013.01); *H04L 49/9036* (2013.01)

(58) Field of Classification Search
CPC ............. H04L 49/9005; H04L 49/9036; H04L 49/3045; H04L 49/3027; H04L 49/3018
See application file for complete search history.

(56) References Cited

U.S. PATENT DOCUMENTS

| | | | |
|---|---|---|---|
| 6,104,696 A * | 8/2000 | Kadambi | H04L 69/161 370/218 |
| 6,219,728 B1 * | 4/2001 | Yin | H04L 12/5601 370/229 |
| 6,456,590 B1 * | 9/2002 | Ren | H04L 47/10 370/229 |
| 7,852,867 B2 | 12/2010 | Tsang | |
| 2001/0025332 A1 * | 9/2001 | Wang | H04J 3/0685 710/317 |
| 2002/0039350 A1 * | 4/2002 | Wang | H04L 49/9078 370/230.1 |
| 2002/0075871 A1 * | 6/2002 | Blanc | H04L 49/201 370/390 |
| 2013/0227066 A1 * | 8/2013 | Sato | H04L 45/74 709/217 |
| 2017/0163567 A1 * | 6/2017 | Roitshtein | H04L 49/205 |
| 2017/0201469 A1 * | 7/2017 | Elias | H04L 43/0817 |
| 2017/0264571 A1 * | 9/2017 | Aibester | H04L 49/9005 |

FOREIGN PATENT DOCUMENTS

GB          706298 A2 * 10/1996 ............ H04W 11/04

* cited by examiner

*Primary Examiner* — Ayaz R Sheikh
*Assistant Examiner* — Tarell A Hampton
(74) *Attorney, Agent, or Firm* — Winston Hsu

(57) ABSTRACT

The present invention provides a circuit within a switch, wherein the circuit includes a memory and a control circuit. The memory includes at least a first area and a second area, the first area is used to provide a minimum guaranteed storage space for each of a plurality of egress queues, the second area is used to provide a shared space of the plurality of egress queues. The control circuit is coupled to the memory, and when an input port of the switch receives an input packet and stores the input packet into the memory, the control circuit dynamically determines a size of the second area according to a number of the egress queues that the input packet is forwarded to.

18 Claims, 10 Drawing Sheets

CIRCUIT WITHIN SWITCH AND METHOD FOR MANAGING MEMORY WITHIN SWITCH

BACKGROUND OF THE INVENTION

1. Field of the Invention

The present invention relates to a switch, and more particularly, to a method for managing a memory within the switch.

2. Description of the Prior Art

The switch is used to receive a packet and forward the packet to the appropriate output according to the contents of the packet. For many reasons, such as L2/L3 multicast transmission, unknown media access control (MAC) destination address flooding, high-speed input, forwarding to low-speed output, multiple inputs and/or forwarding to the same output, etc., the received packets cannot be transmitted immediately, so the packets must be stored in a memory. After all of these packets are forwarded to the output ports, the memory address storing the packets can be released for use in subsequent packets. Because this memory is used to store packets, the memory is generally called a packet buffer.

In today's switch technology, the speed and number of input/output ports of the switch are increasing. Under the consideration of cost, the packet buffer cannot be increased in a large amount. In this case, how to make all Input/output ports to efficiently use the packet buffer has become an important issue.

SUMMARY OF THE INVENTION

It is therefore an objective of the present invention to provide a circuit within a switch and a method for managing a memory within the switch, which can dynamically configure a space within the packet buffer to allow the packet buffer to be used efficiently, to solve the above-mentioned problems.

In an embodiment of the present invention, a circuit within a switch is disclosed, wherein the circuit includes a memory and a control circuit. The memory comprises at least a first area and a second area, wherein the first area is used to provide a minimum guaranteed storage space for each of a plurality of egress queues, the second area is used to provide a shared space of the plurality of egress queues. When an input port of the switch receives an input packet and stores the input packet into the memory, the control circuit dynamically determines a size of the second area according to quantity of the egress queues that the input packet is forwarded to.

In another embodiment of the present invention, a method for managing a memory within a switch is disclosed, wherein the memory comprises at least a first area and a second area, the first area is used to provide a minimum guaranteed storage space for each of a plurality of egress queues, the second area is used to provide a shared space of the plurality of egress queues, and the method comprises the steps of: when an input port of the switch receives an input packet and stores the input packet into the memory, dynamically determining a size of the second area according to quantity of the egress queues that the input packet is forwarded to.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
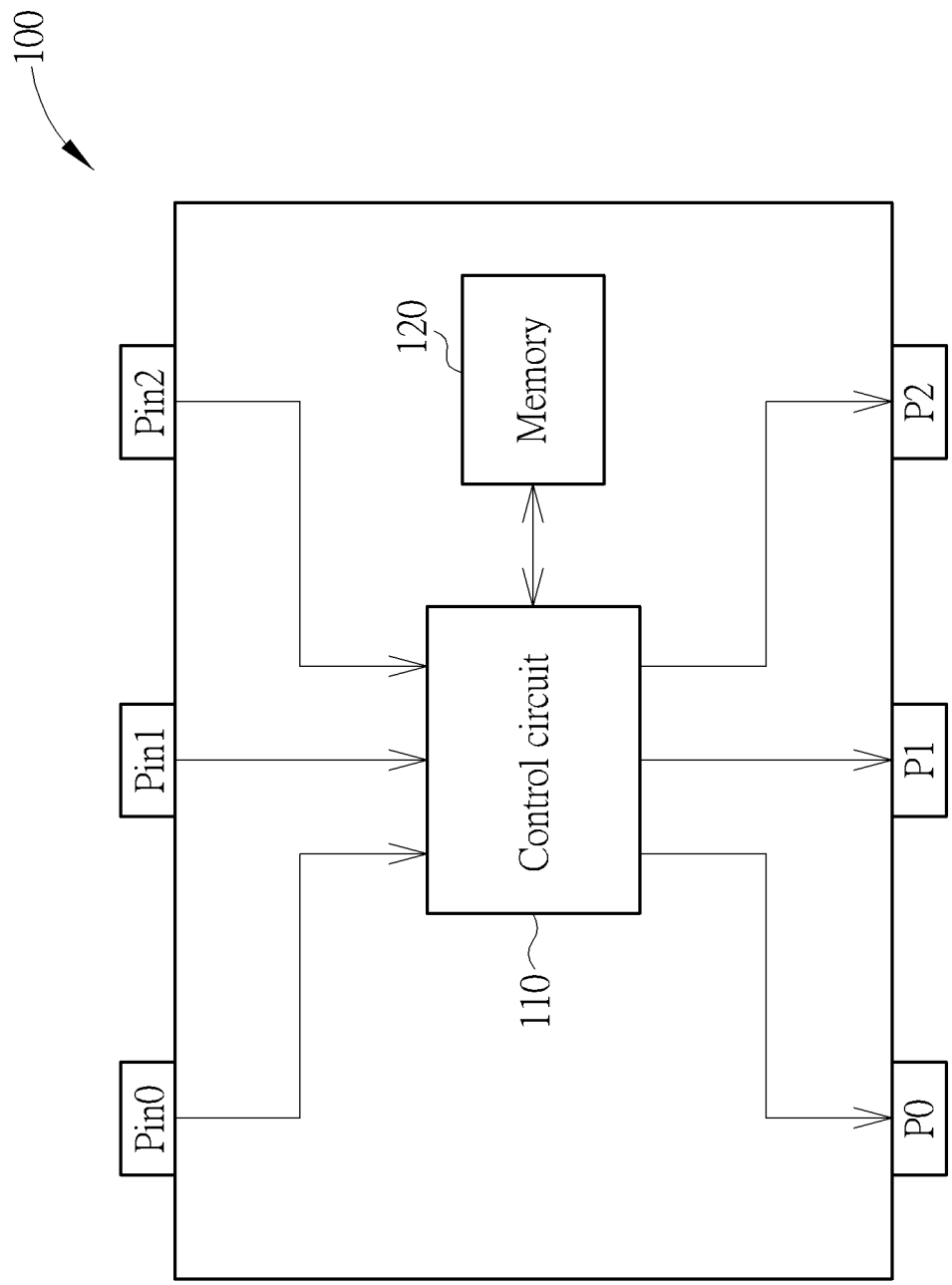
FIG. 1 is a diagram illustrating a switch according to one embodiment of the present invention.

FIG. 1 is a diagram illustrating a switch 100 according to one embodiment of the present invention. As shown in FIG. 1, the switch 100 comprises a plurality of input ports (three input ports Pin0, Pin1 and Pin2 serve as the plurality of input ports in this embodiment), a plurality of output ports (three output ports P0, P1 and P2 serve as the plurality of output ports in this embodiment), a control circuit 110 and a memory 120. The control circuit 110 is configured to receive packet(s) from at least one of the input ports Pin0, Pin1 and Pin2, and forward the packet(s) to at least one of the output ports P0, P1 and P2.

Figure 2:
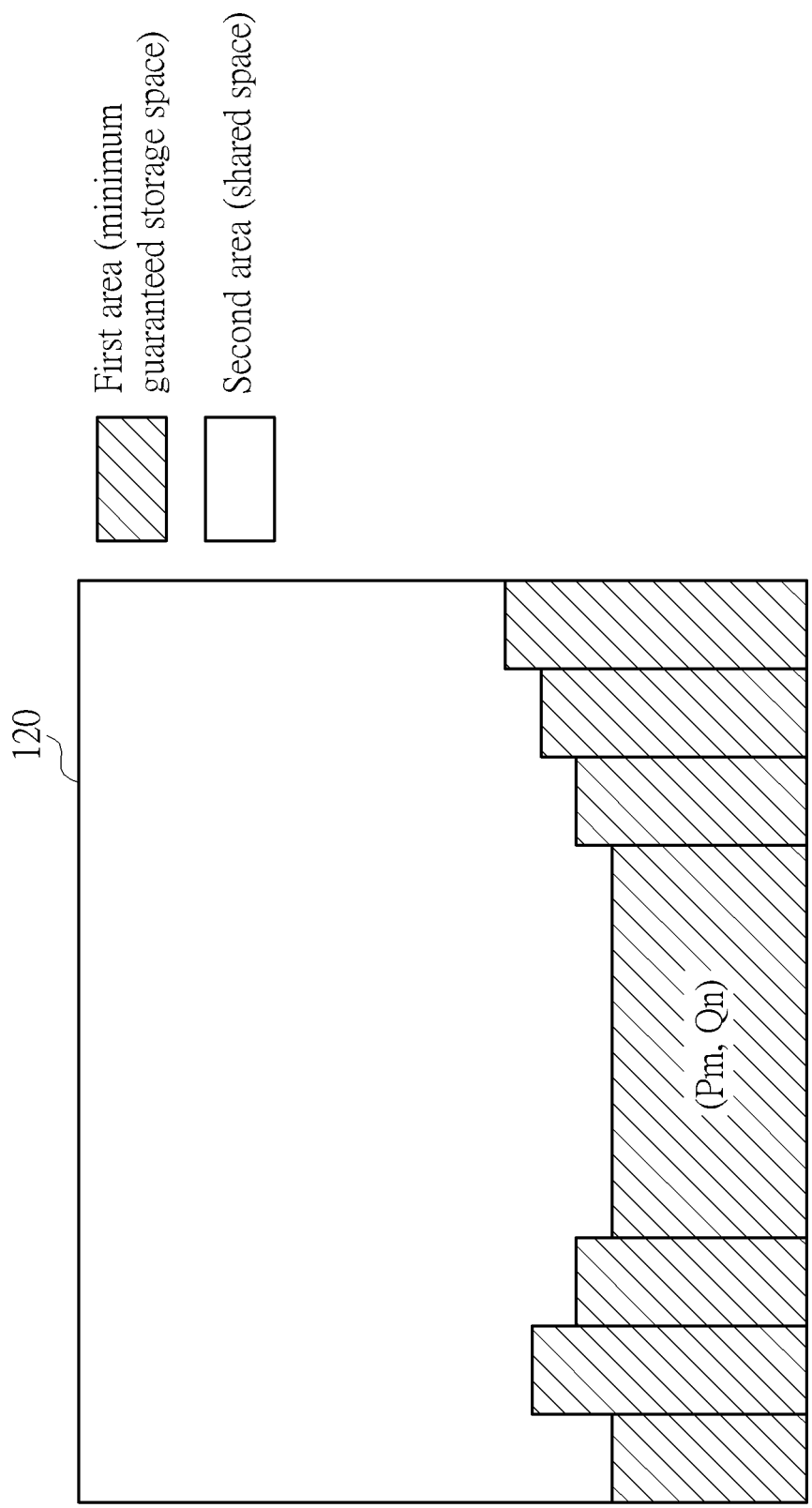
FIG. 2 shows a first area and a second area within the memory.

When a packet is inputted to the switch 100, the packet is temporarily stored in the memory 120 serving as a packet buffer, and then transmitted to the appropriate output ports P0, P1, P2 through the control circuit 110. In the configuration of the memory 120, as shown in FIG. 2, the memory 120 includes at least a first area and a second area, wherein the first area serves as a minimum guaranteed storage space for each egress queue of each output port (the shaded area in FIG. 2, "Pm" is a serial number of the output port, "Qn" is a serial number of the egress queue), and the second area is a shared space. Regarding the first area, since the minimum guaranteed storage space of each of the egress queue is set in the memory 120, taking the first egress queue Q1 of the first port P1 as an example, no matter when the packet is forwarded to the egress queue Q1, as long as the packet currently stored in the memory 120 corresponding to the egress queue Q1 does not exceed its minimum guaranteed storage space, the packet can be immediately stored in the memory 120. Therefore, it can improve the fairness of each egress queue in the memory 120. In addition, the second area is used for each egress queue of each output port, taking the egress queue Q1 as an example, if the total number of packets currently stored in the memory 120 corresponding to the egress queue Q1 has reached the minimum guaranteed storage space, the packet that is subsequently inputted to the switch 100 and corresponding to the egress queue Q1 can be directly stored in the second area if the second area has enough storage space.

In order to manage the first area and the second area in the memory 120, the control circuit 110 has a counter to calculate the input and output of the packet corresponding to each egress queue of each output port to determine the remaining space of the minimum guaranteed storage space of each egress queue, for the management of the memory 120. In an example, it is assumed that the switch 100 receives a packet that needs to be forwarded to three output ports P0, P1, P2 from the input port Pin1, and if the three output ports P0, P1, P2 do not reach their minimum guaranteed storage space, the minimum guaranteed storage space corresponding to the three output ports P0, P1, and P2 are all reduced the data amount of one packet even if only one packet is stored in the memory 120. Therefore, in this case, since the calculation of the minimum guaranteed storage space is three packets, and the memory 120 actually stores only one packet, thereby causing waste of the storage space of the two packets in the memory 120. The utilization rate of the memory 120 is lowered.

Therefore, in order to solve this problem, the present embodiment proposes a method for managing the memory 120, which can dynamically adjust the size of the second area by referring to the number of the output ports that the packet is forwarded to and the space of the first area that the packet uses, to utilize the storage space of the memory 120 more efficiently.

In detail, the control circuit 110 builds four parameters Qn_USED, Q_SHARE_USED, Q_GUA_USED, and Q_GUA_REMAIN for the management of the memory 120. The parameter Qn_USED is a parameter that each egress queue has, representing the usage of its corresponding egress queue in the memory 120, that is, when the incoming packet is forwarded to the egress queue, the parameter is incremented by "1"; and when the packet has been sent from all of the egress queue(s) that is/are needed to be forwarded, the parameter Qn_USED corresponding to each of the egress queue(s) is decremented by "1". The parameter Q_SHARE_USED indicates how many pages in the memory 120 are currently used by the packets stored in the second area (i.e. the shared space), and the calculation is that when the minimum guaranteed storage space of all of the egress queues that the incoming packet is forwarded is reached (i.e. all of the minimum guaranteed storage space of the egress queues that the incoming packet is forwarded has stored packets), the parameter Q_SHARE_USED is incremented by "1"; and when the packet satisfying the releasing conditions of the memory 120 is sent from the egress queue and the parameter Q_SHARE_USED is greater than one, the parameter Q_SHARE_USED is decremented by "1". The parameter Q_GUA_USED can be regarded as a used parameter, which means that the current usage in the memory 120 is occupied by the packet stored in the minimum guaranteed storage space, and the calculation method is that when the incoming packet is forwarded to any egress queue whose minimum guaranteed storage space is not filled, the parameter Q_GUA_USED is incremented by "1"; and when the parameter Q_SHARE_USED is equal to zero, if the packet is sent from the egress queue and the releasing condition of the memory 120 is satisfied, the parameter Q_GUA_USED is decremented by "1". The parameter Q_GUA_REMAIN can be regarded as a remaining parameter, which indicates the number of pages that the memory 120 must retain, so that all the egress queues can at least ensure the usage of the respective minimum guaranteed storage space. when the packet is inputted into the switch 100 and forwarded to a plurality of egress queues, if there are N egress queues whose minimum guaranteed storage space are not filled, the parameter Q_GUA_REMAIN is decremented by "N"; and if the packet is sent from the egress queue, as long as the parameter Qn_USED corresponding to the egress queue is less than the minimum guaranteed storage space, the parameter Q_GUA_REMAIN is incremented by "1".

In the above four parameters, only the parameter Qn_USED is arranged for each egress queue (i.e. each egress queue has its own parameter Qn_USED), and the remaining three parameters Q_SHARE_USED, Q_GUA_USED and Q_GUA_REMAIN are for all the egress queues (i.e. all the egress queues have the same parameters Q_SHARE_USED, Q_GUA_USED and Q_GUA_REMAIN).

The parameter Q_GUA_USED can be regarded as the number of pages that have been used in the first area (which can be regarded as the number of packets in this embodiment). The parameter Q_GUA_REMAIN is arranged to ensure that all the egress queues can at least get the minimum guaranteed storage space, therefore, the parameter Q_GUA_REMAIN is regarded as the number of pages to be retained by the memory 120 in the worst case (all the incoming packets are unicast packets). Then, the summation of the parameter Q_GUA_USED and the parameter Q_GUA_REMAIN can be used to obtain the actual minimum guaranteed storage space under the current situation, and the maximum usage amount of the second region (i.e. the shared space) can be dynamically adjusted by the following equation:

$$Q\_SHARE\_TOTAL = Q\_TOTAL - (Q\_GUA\_USED + Q\_GUA\_REMAIN),$$

wherein Q_SHARE_TOTAL is the maximum usage amount of the second area, and Q_TOTAL is the total space of the memory 120.

Figure 3:
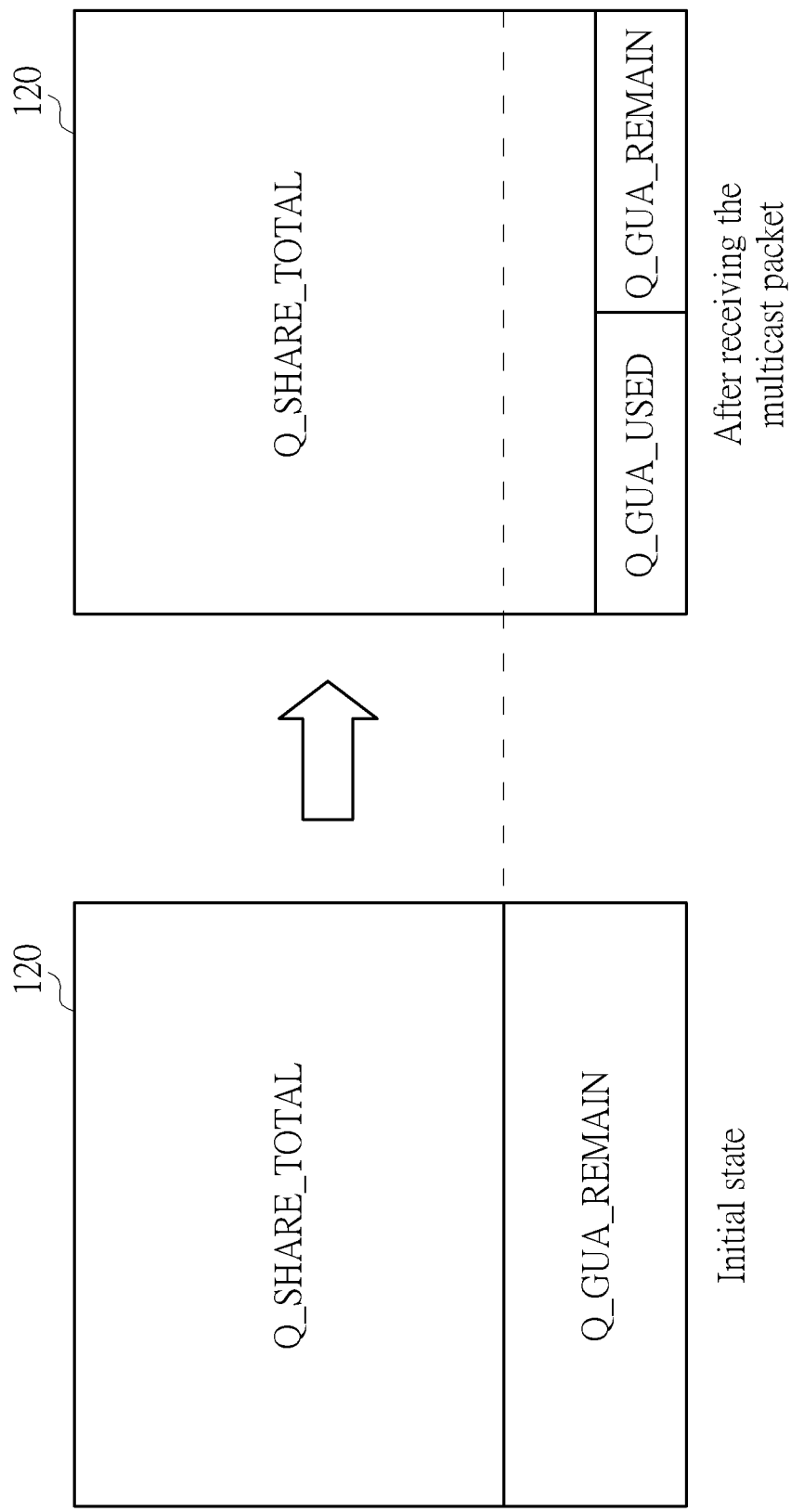
FIG. 3 is a diagram showing a maximum usage of the second area according to one embodiment of the present invention.

FIG. 3 illustrates the concept of the embodiment. In the initial state (that is, no packet has been received), the first area and the second area included in the memory 120 correspond to the parameters Q_GUA_REMAIN and Q_SHARE_TOTAL, respectively. Then, when the multicast packet is received, since the summation of the parameter Q_GUA_USED and the parameter Q_GUA_REMAIN is smaller than the original parameter Q_GUA_REMAIN of the initial state, the maximum usage Q_SHARE_TOTAL of the second area (i.e. the shared space) will increase for storing subsequent packets.

Figure 4:
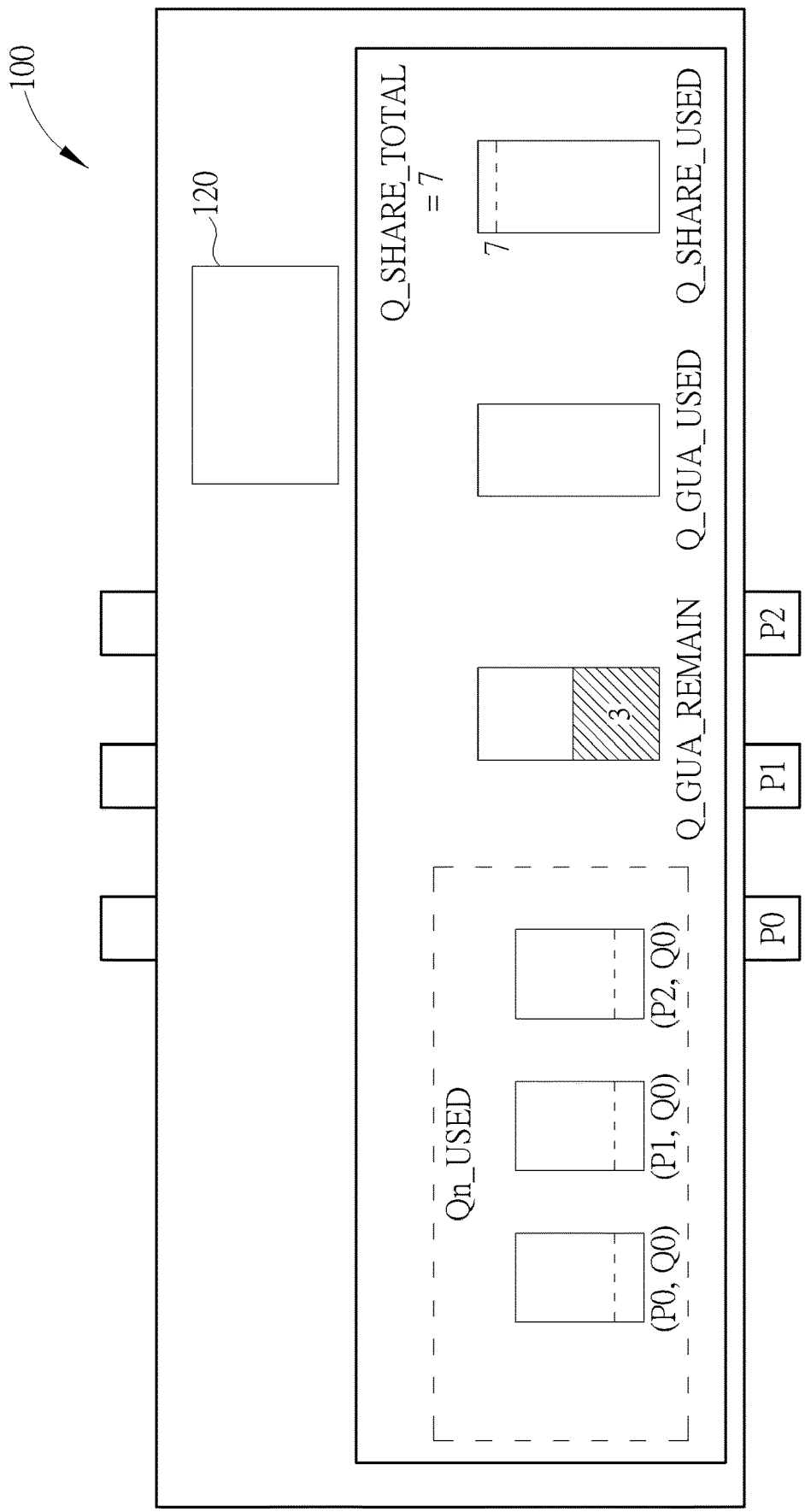
FIGS. 4-7 show how to dynamically adjust the maximum usage of the second area according to one embodiment of the present invention.

FIGS. 4-7 show a method of dynamically adjusting the maximum usage amount Q_SHARE_TOTAL of the second area (i.e., the shared space) according to one embodiment of the present invention. For convenience of explanation, the following description assumes that the switch 100 manages only three egress queues (P0, Q0), (P1, Q0), (P2, Q0), and the number of pages available for storing the packets in the memory 120 is "10". (i.e., Q_TOTAL=10), the size of each packet is equal to one page, and the minimum guaranteed storage space for each egress queue is "1". Therefore, under this setting, the parameters Qn_USED, Q_SHARE_USED, and Q_GUA_USED of the switch 100 in the initial state are all set to be "0", and the parameter Q_GUA_REMAIN is the summation of the minimum guaranteed storage space of the egress queues (i.e., Q_GUA_REMAIN=3), the maximum usage amount of the second area Q_SHARE_TOTAL is "7". The parameters of the switch 100 in the initial state are as shown in FIG. 4.

Figure 5:
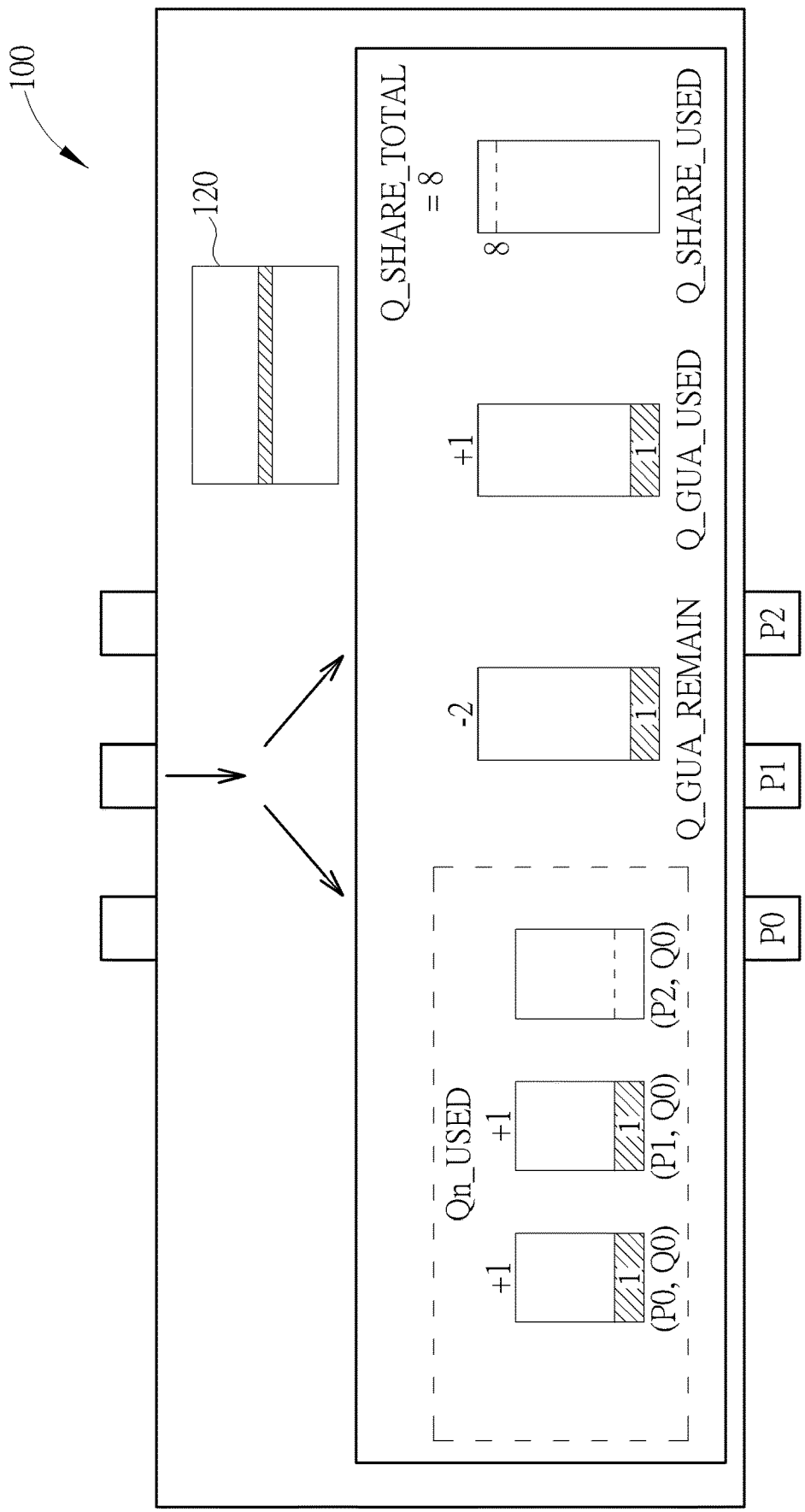

In FIG. 5, it is assumed that the switch 100 receives the first packet, where the first packet is to be forwarded to the egress queues (P0, Q0) and (P1, Q0). Because the minimum guaranteed storage space of the egress queues (P0, Q0) and (P1, Q0) have not been filled, the parameter Q_GUA_REMAIN will be decremented by "2" and become "1", and the parameters Qn_USED of the egress queues (P0, Q0) and (P1, Q0) will be incremented by "1", the parameter Q_GUA_USED is also incremented by "1", and the parameter Q_SHARE_TOTAL is adjusted to be "8" in this case (i.e., 10−1−1=8).

Figure 6:
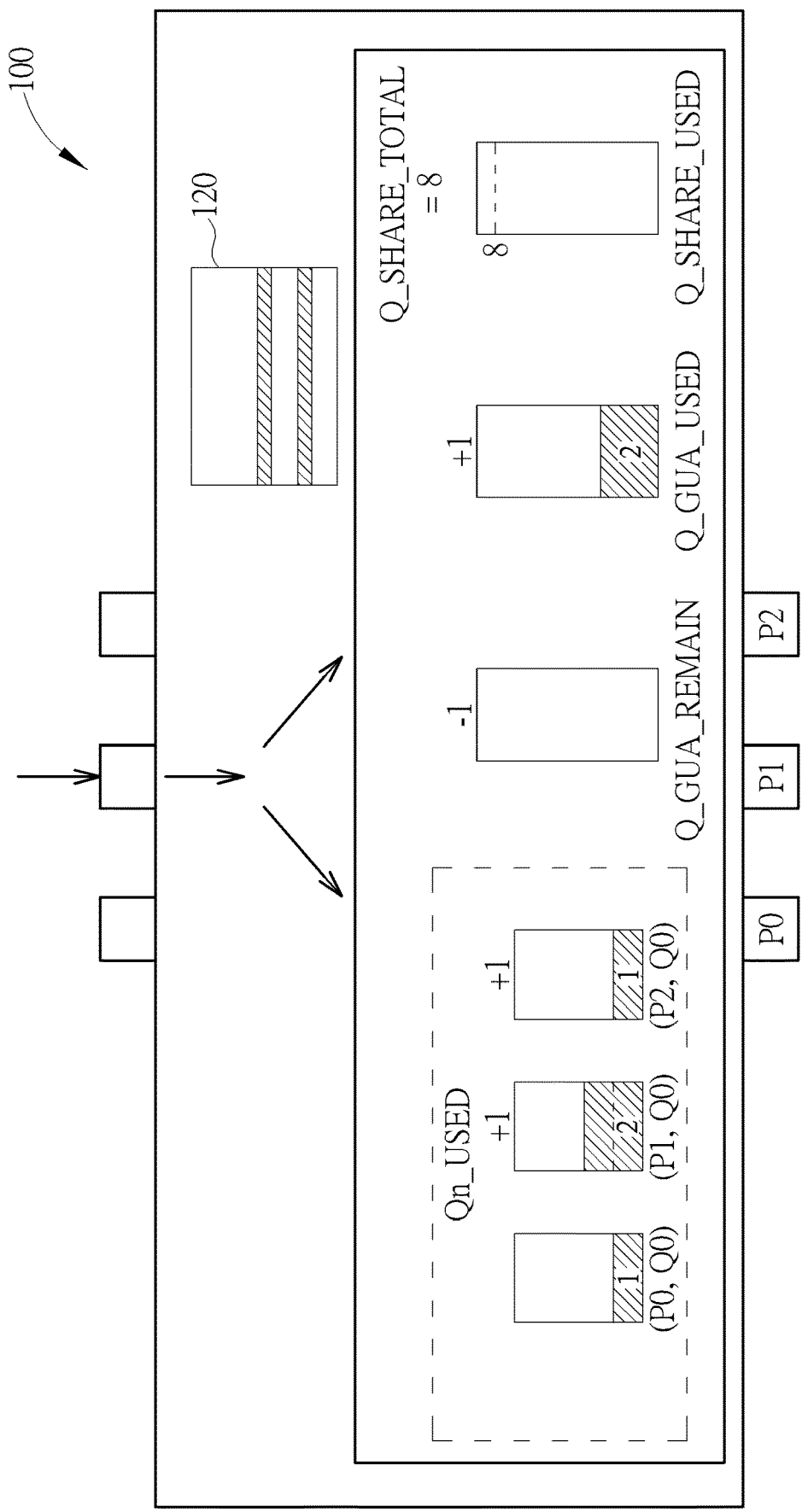

In FIG. 6, the switch 100 receives the second packet, where the second packet is to be forwarded to the egress queues (P1, Q0) and (P2, Q0). Because the minimum guaranteed storage space of the egress queue (P2, Q0) has not been filled, the parameter Q_GUA_REMAIN will be decremented by "1" and become "0", the parameters Qn_USED of the egress queue (P1, Q0) will be incremented by "1" and become "2", the parameters Qn_USED of the egress queue (P2, Q0) will be incremented by "1" and become "2", the parameter Q_GUA_USED is also incremented by "1" and become "2", and the parameter Q_SHARE_TOTAL remains "8" (i.e., 10−2−0=8).

Figure 7:
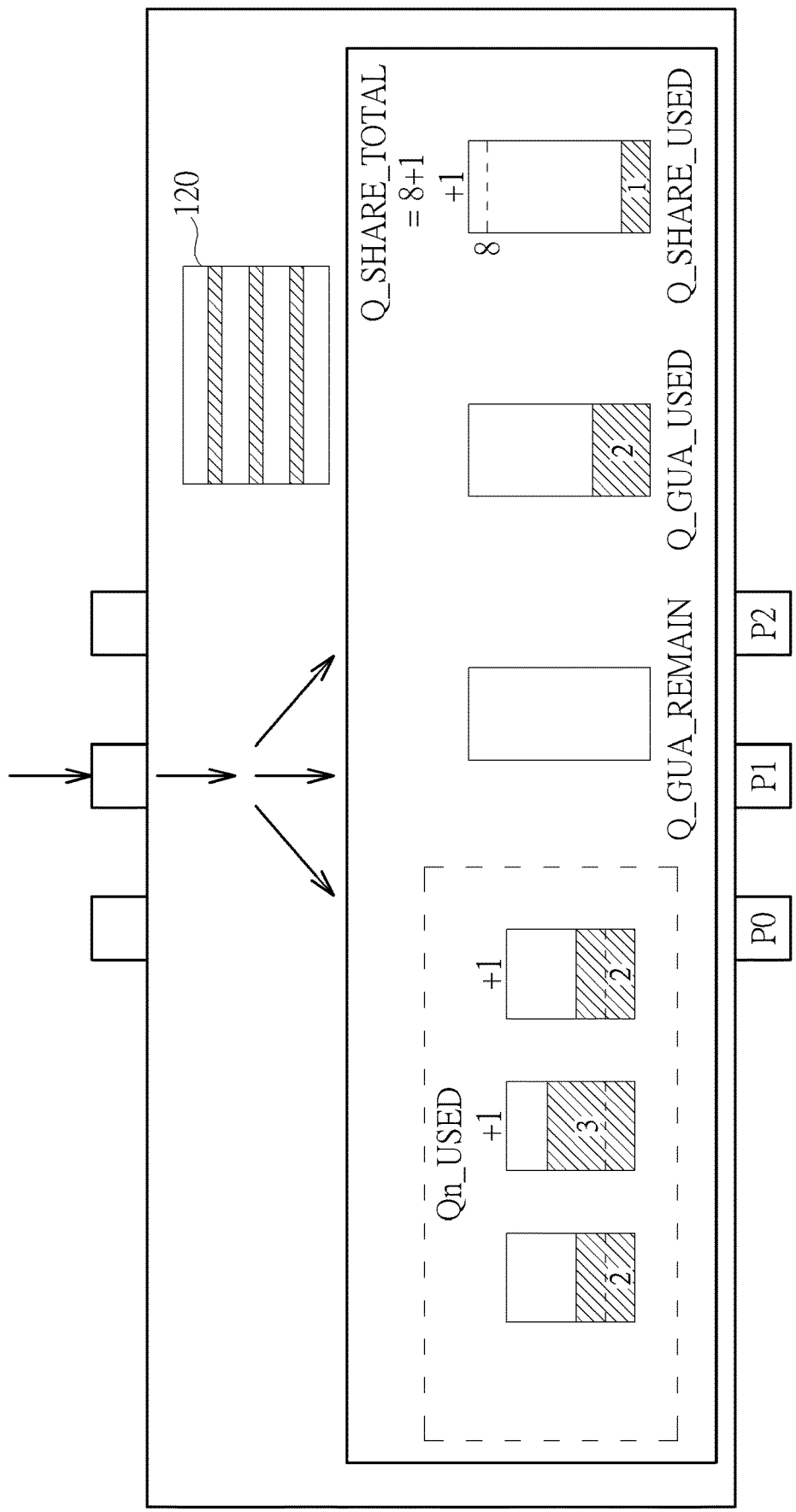

In FIG. 7, the switch 100 receives the third packet, where the third packet is to be forwarded to the egress queues (P0, Q0), (P1, Q0) and (P2, Q0). Because the minimum guaranteed storage space of the egress queue (P0, Q0), (P1, Q0) and (P2, Q0) have been filled, the parameter Q_GUA_REMAIN remains "0", the parameters Qn_USED of the egress queues (P0, Q0), (P1, Q0) and (P2, Q0) will be incremented by "1" and become "2", "3" and "3", respectively. Because the minimum guaranteed storage space of the egress queues that the third packet is forwarded to have been filled, the parameter Q_SHARE_USED is incremented by "1" and become "1", and the parameter Q_SHARE_TOTAL remains "8" (i.e., 10−2−0=8).

As described in the embodiment shown in FIGS. 4-7, the maximum usage amount Q_SHARE_TOTAL of the second area is dynamically adjusted according to the multicast packet, even if the minimum guaranteed storage space of the egress queues (P0, Q0), (P1, Q0) and (P2, Q0) has been filled, the parameter Q_SHARE_TOTAL can also be changed from "7" in the initial state to "8", to improve the utilization of the memory 120.

In addition, when the packet stored in the memory 120 is output from the output ports P0-P2, the maximum usage amount Q_SHARE_TOTAL of the second area is also dynamically adjusted. Following the example shown in FIG. 7, first, suppose that the packet sent at the beginning is the third packet, and after the packets are respectively sent from the egress queues (P0, Q0), (P1, Q0), (P2, Q0), the parameters Qn_USED of the egress queues (P0, Q0), (P1, Q0), (P2, Q0) are decremented by "1" and become "1", "2", "1", respectively. At this time, because the minimum guaranteed storage space of the egress queues (P0, Q0), (P1, Q0), (P2, Q0) has been filled, the parameter Q_GUA_REMAIN remains "0", the parameter Q_SHARE_USED will be decremented by "1" and become "0", and the parameter Q_SHARE_TOTAL remains "8".

Then, assume that the next packet to be sent is the first packet forwarded to the egress queue (P0, Q0) and (P1, Q0), after the first packet is sent from the egress queue (P0, Q0) and (P1, Q0), the parameters Qn_USED of the egress queue (P0, Q0) and (P1, Q0) are decremented by "1" to become "0" and "1" respectively. Because the minimum guaranteed storage space of the egress queue (P0, Q0) is not filled when the packet is sent, the parameter Q_GUA_REMAINING will be incremented by "1" and become "1", the parameter Q_GUA_USED will be decremented by "1" and become "1", and the parameter Q_SHARE_TOTAL remains "8" (10−1−1=8).

Then, the next packet to be sent is the second packet forwarded to the egress queues (P1, Q0) and (P2, Q0), and after the second packet is sent from the egress queues (P1, Q0) and (P2, Q0), the parameters Qn_USED of the egress queues (P1, Q0) and (P2, Q0) are decremented by "1" and all become "0". Because the minimum guaranteed storage space of the egress queues (P1, Q0), (P2, Q0) is not filled, the parameter Q_GUA_REMAIN will be incremented by "2" and become "3", the parameter Q_GUA_USED is decremented by "1" and become "0", and the parameter Q_SHARE_TOTAL will become "7" (10−0−3=7).

After the third packet, the first packet, and the second packet are sequentially sent, the above parameters are also returned to the initial state, and the maximum usage amount of the second area Q_SHARE_TOTAL is dynamically adjusted during the process. Therefore, the embodiment indeed have correct and feasibility operations.

Figure 8:
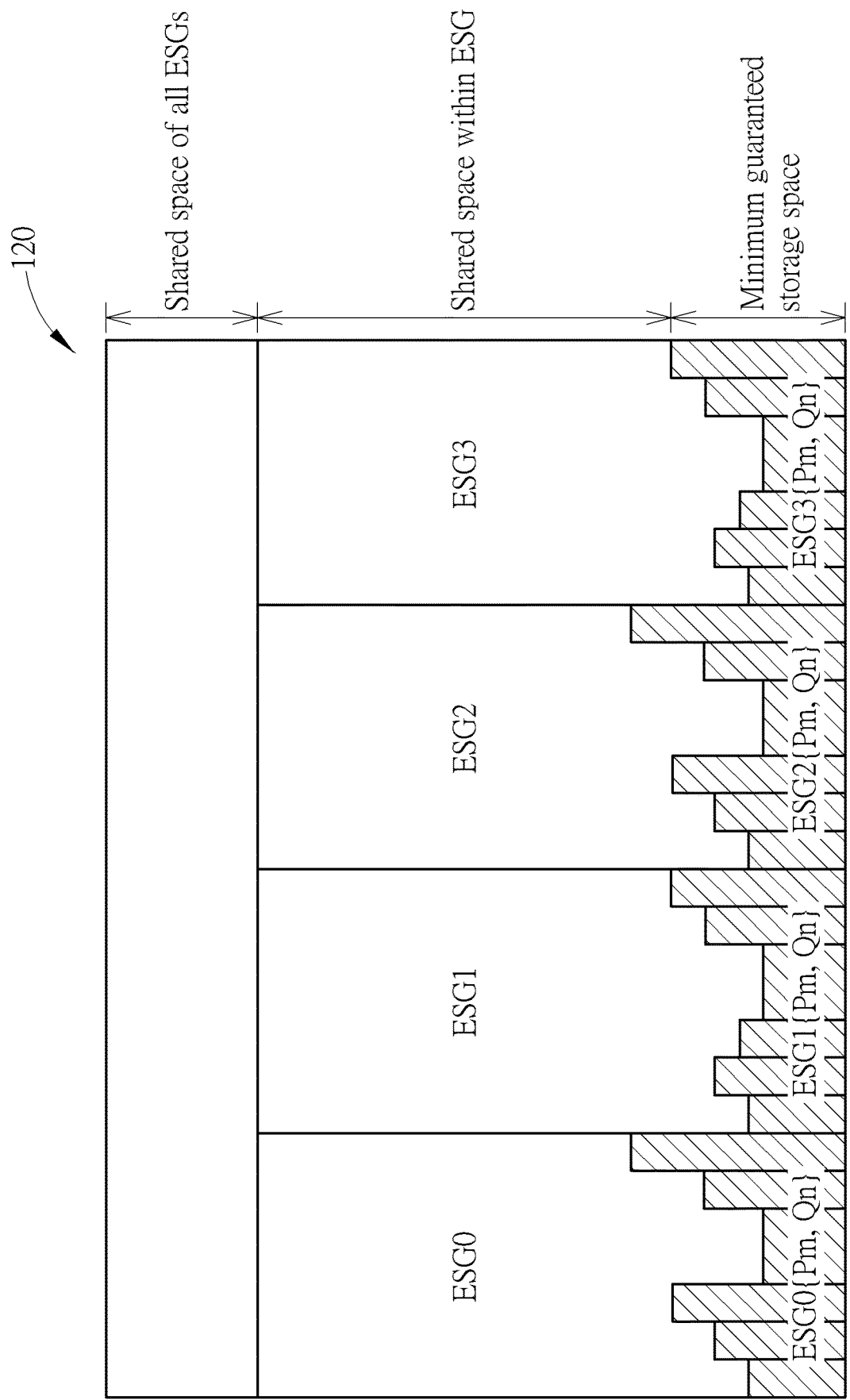
FIG. 8 is a diagram showing a memory management method of a logic queue/virtual queue.

The method for managing the egress queues described in the above FIGS. 1-7 is not limited to a physical queue, but may be applied to a logical queue or a virtual queue. FIG. 8 illustrates the management method of the memory 120 applied to the logical queue/virtual queue according to one embodiment of the present invention. Referring to FIG. 8, the lower area of the memory 120 can be allocated as the minimum guaranteed storage space for each of the egress queues. Taking the first egress queue Q1 of the output port P1 as an example, no matter when the packet is forwarded to the egress queue Q1, as long as the packet currently stored in the memory 120 corresponding to the egress queue Q1 does not exceed its minimum guaranteed storage space, the packet can be immediately stored in the memory 120. Therefore, it can improve the fairness of each egress queue in the memory 120. The middle area of the memory 120 is to combine some egress queues into egress system groups ESG0-ESG3 according to the applications. For example, the egress queues for transmitting the audio and video data can be combined into an egress system group, or all sets of egress queues within the upstream port are grouped into another egress system group. For each of the egress system groups, the middle area corresponding thereto can be regarded as a shared space of the plurality of egress queue. Taking the egress queue Q1 in the egress system group ESG0 as an example, if the total number of packets currently stored in the memory 120 corresponding to the egress queue Q1 has reached the minimum guaranteed storage space, the packet that is subsequently inputted to the switch 100 and corresponding to the egress queue Q1 can be directly stored in the middle area corresponding to the egress system group. The upper area of the memory 120 can be regarded as a common area of all the egress queue groups ESG0-ESG3, and the upper area is configured to take into account that each incoming packet may use multiple pages in the memory 120. so when the second area of the memory 120 is filled but the packet has not successfully written into the memory 120, the subsequent contents of the packet will be stored in the upper area to make the packet be processed completely.

Each of the egress system groups ESG0-ESG3 shown in FIG. 8 may be a so-called logical queue/virtual queue, which will aggregate multiple physical egress queues according to applications and become a management unit, and each one the logical queue/virtual queue will also be used in the use of the memory 120 as shown in FIG. 2 for each of the egress system groups ESG0-ESG3 (i.e., the memory configuration method of each logical queue/virtual queue or the egress system groups ESG0-ESG3 can refer to the embodiment of FIGS. 2-7). The upper area is the shared space of the logical queue/virtual queue, and the concept is analogized to the second area shared by the plurality of egress queues shown in FIG. 2, and thus the embodiments of FIGS. 2-7 can also be applied to the logical queue/virtual queue.

Figure 9:
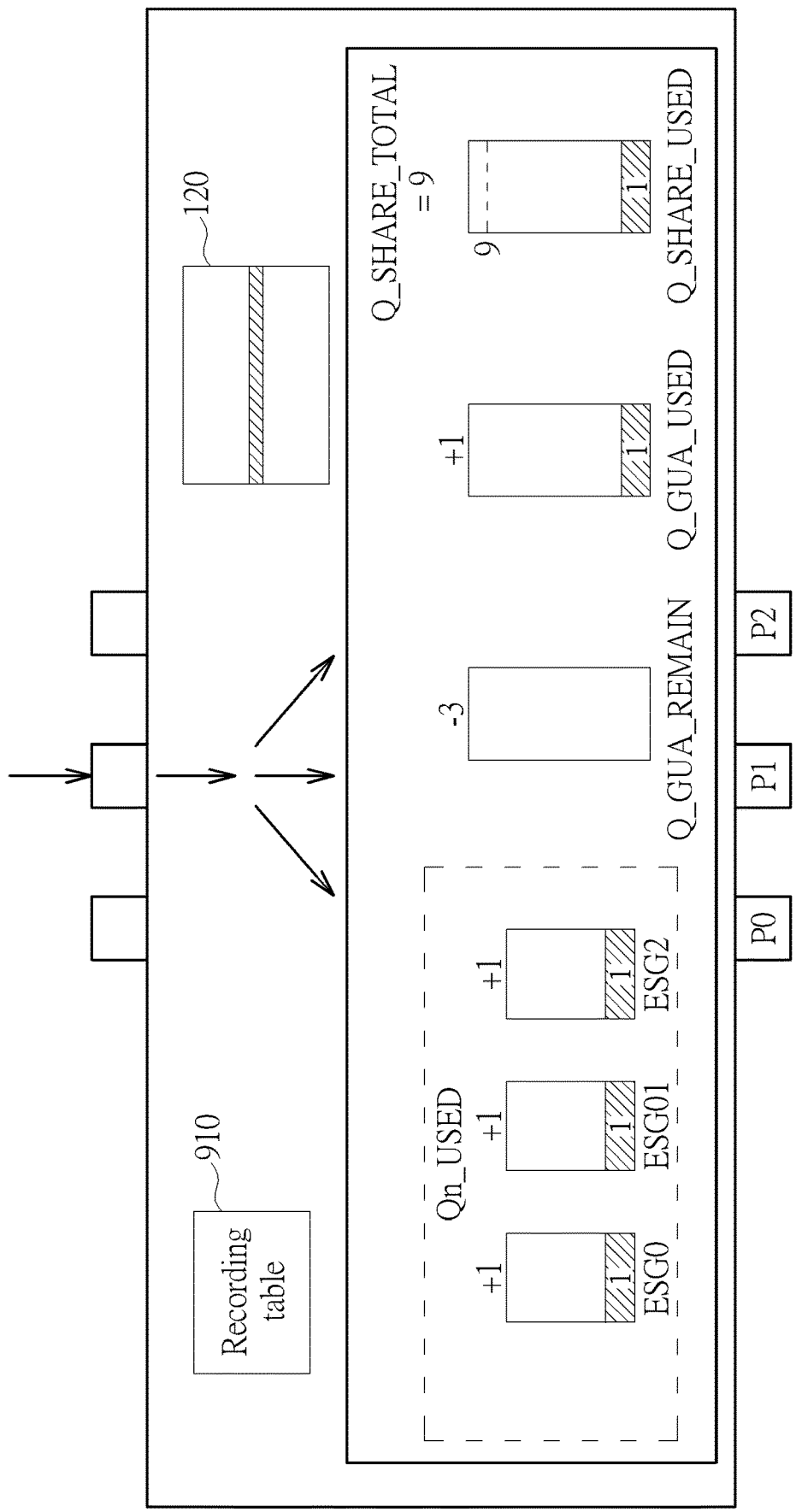
FIGS. 9-10 show how to dynamically adjust the maximum usage of the second area according to another embodiment of the present invention.
Figure 10:
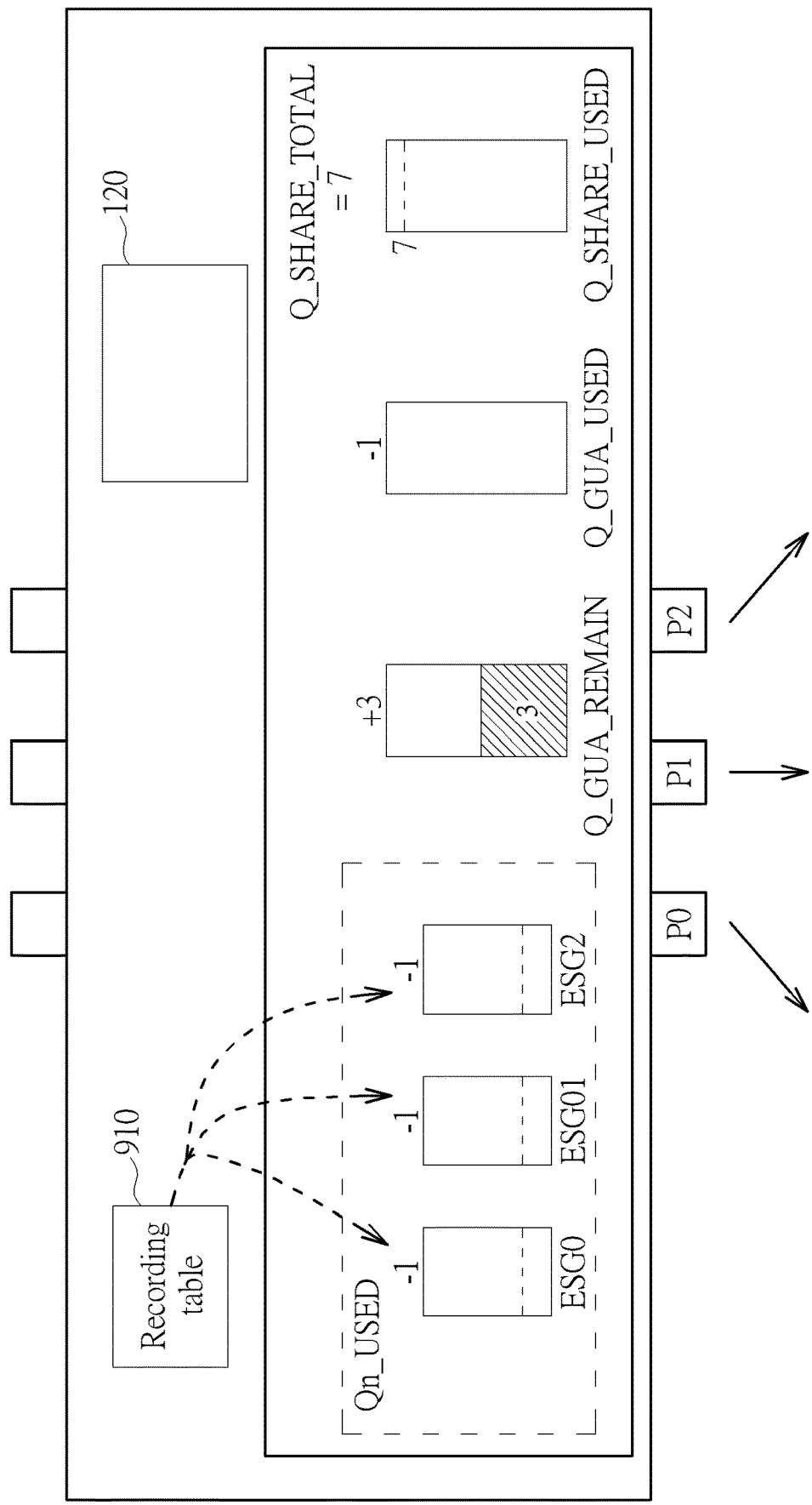

FIG. 9 shows a method of dynamically adjusting the maximum usage amount Q_SHARE_TOTAL of the upper area (i.e., the shared space of all the egress system groups ESG0-ESG3) according to one embodiment of the present invention. For convenience of explanation, the following description assumes that the switch 100 manages only three egress system groups ESG0-ESG2 (i.e., three logical queue/virtual queue), and the number of pages available for storing the packets in the memory 120 is "10". (i.e., Q_TOTAL=10), the size of each packet is equal to one page, and the minimum guaranteed storage space for each system group is "1". Therefore, under this setting, the parameters Qn_USED, Q_SHARE_USED, and Q_GUA_USED of the switch 100 in the initial state are all set to be "0", and the parameter Q_GUA_REMAIN is the summation of the minimum guaranteed storage space of the egress system groups (i.e., Q_GUA_REMAIN=3), the maximum usage amount of the shared area Q_SHARE_TOTAL is "7".

In FIG. 9, it is assumed that the switch 100 receives the first packet, where the first packet is to be forwarded to the egress system groups ESG0-ESG2. Because the minimum guaranteed storage space of the egress system groups ESG0-ESG2 have not been filled, the parameter Q_GUA_REMAIN will be decremented by "3" and become "0", and the parameters Qn_USED of the egress system groups ESG0-ESG2 will be incremented by "1" and become "1", the parameter Q_GUA_USED is also incremented by "1" and become "1", and the parameter Q_SHARE_TOTAL is adjusted to be "9". In addition, the control circuit 110 records the address of the egress system groups to be forwarded in a record table 910.

In addition, when the packet stored in the memory 120 is output from the output ports P0-P2, the maximum usage amount Q_SHARE_TOTAL of upper area is also dynamically adjusted. Specifically, after the packets are respectively sent from the egress system groups ESG0-ESG2, the parameters Qn_USED of the egress system groups ESG0-ESG2 are decremented by "1" and become "0", "0", "0", respectively by referring to the record table 910. At this time, because the packets occupy the minimum guaranteed storage space of the egress system groups ESG0-ESG2, the parameter Q_GUA_REMAIN will be incremented by "3" and become "3", the parameter Q_GUA_USED will be decremented by "1" and become "0", and the parameter Q_SHARE_TOTAL is adjusted to be "7" (10−0−3=7).

Briefly summarized, in the circuit within the switch and the method for managing the memory within the switch of the present invention, by dynamically adjusting the maximum usage amount of the shared space of the egress queues according to the number of the egress queues that the packet is forwarded to and the amount of the minimum guaranteed storage space, the memory/packet buffer can be used in the most efficient way.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit within a switch, comprising:
    a memory, wherein the memory comprises at least a first area and a second area, the first area is used to provide a minimum guaranteed storage space for each of a plurality of egress queues, the second area is used to provide a shared space of the plurality of egress queues; wherein a packet corresponding to one egress queue is always stored into the minimum guaranteed storage space for the one egress queue when packets stored in the one egress queue does not exceed its minimum guaranteed storage space, and the packet is stored in the shared space of the plurality of egress queues if the packets stored in the one egress queue reach its minimum guaranteed storage space; and
    a control circuit, coupled to the memory, wherein when an input port of the switch receives an input packet and stores the input packet into the memory, the control circuit dynamically determines a size of the second area according to a number of the egress queues that the input packet is forwarded to;
    wherein when the input packet is forwarded to multiple egress queues, and the minimum guaranteed storage spaces corresponding to the multiple egress queues in the first area have not been filled, the control circuit increases the size of shared space in the second area.

2. The circuit of claim 1, wherein when the input packet is forwarded to multiple egress queues, and a number of the multiple egress queues having the minimum guaranteed storage space in the first area is greater than one, the control circuit increases the size of the second area.

3. The circuit of claim 1, wherein the circuit records a used parameter and a remaining parameter corresponding to the first area, and the control circuit dynamically determines the size of the second area according to the used parameter and the remaining parameter.

4. The circuit of claim 3, wherein the used parameter is the number of the input packets stored in the first area, the remaining parameter is a value generated by subtracting the number of the egress queues having the minimum guaranteed storage space in the first area from a predetermined value, and the control circuit obtains the size of the second area by subtracting a summation of the used parameter and the remaining parameter from a total space.

5. The circuit of claim 4, wherein when the input packet is forwarded to multiple egress queues, and N egress queues of the multiple egress queues have the minimum guaranteed storage space in the first area, the control circuit adds one to the used parameter, and subtracts N from the remaining parameter.

6. The circuit of claim 1, wherein when multiple egress queues corresponding to the input packet stored in the memory are sent out from a plurality of output ports of the switch, the control circuit dynamically determines the size of the second area according to a number of the multiple egress queues.

7. A circuit within a switch, comprising:
    a memory, wherein the memory comprises at least a first area and a second area, the first area is used to provide a minimum guaranteed storage space for each of a plurality of egress queues, the second area is used to provide a shared space of the plurality of egress queues; wherein a packet corresponding to one egress queue is always stored into the minimum guaranteed storage space for the one egress queue when packets stored in the one egress queue does not exceed its minimum guaranteed storage space, and the packet is stored in the shared space of the plurality of egress queues if the packets stored in the one egress queue reach its minimum guaranteed storage space; and
    a control circuit, coupled to the memory, wherein when an input port of the switch receives an input packet and stores the input packet into the memory, the control circuit dynamically determines a size of the second area according to a number of the egress queues that the input packet is forwarded to;

wherein when multiple egress queues corresponding to the input packet stored in the memory are sent out from a plurality of output ports of the switch, the control circuit dynamically determines the size of the second area according to a number of the multiple egress queues;

wherein when the multiple egress queues corresponding to the input packet stored in the memory are sent out from the plurality of output ports of the switch, if a number of the multiple egress queues which its memory usage is not over the corresponding minimum guaranteed space is greater than one, the control circuit decreases the size of the second area.

8. The circuit of claim 6, wherein the circuit records a used parameter and a remaining parameter corresponding to the first area, the used parameter is the number of the input packets stored in the first area, the remaining parameter is a value generated by subtracting the number of the egress queues having the minimum guaranteed storage space in the first area from a predetermined value, and the control circuit obtains the size of the second area by subtracting a summation of the used parameter and the remaining parameter from a total space.

9. The circuit of claim 1, wherein the plurality of egress queues are a plurality of logical queue/virtual queue.

10. A method for managing a memory within a switch, wherein the memory comprises at least a first area and a second area, the first area is used to provide a minimum guaranteed storage space for each of a plurality of egress queues, the second area is used to provide a shared space of the plurality of egress queues; wherein a packet corresponding to one egress queue is always stored into the minimum guaranteed storage space for the one egress queue when packets stored in the one egress queue does not exceed its minimum guaranteed storage space, and the packet is stored in the shared space of the plurality of egress queues if the packets stored in the one egress queue reach its minimum guaranteed storage space; and the method comprises:

when an input port of the switch receives an input packet and stores the input packet into the memory, dynamically determining a size of the second area according to a number of the egress queues that the input packet is forwarded to;

wherein the step of dynamically determining the size of the second area according to the number of the egress queues that the input packet is forwarded to comprises:

when the input packet is forwarded to multiple egress queues, and the minimum guaranteed storage spaces corresponding to the multiple egress queues in the first area have not been filled, increasing the size of shared space in the second area.

11. The method of claim 10, wherein the step of dynamically determining the size of the second area according to the number of the egress queues that the input packet is forwarded to comprises:

when the input packet is forwarded to multiple egress queues, and a number of the multiple egress queues having the minimum guaranteed storage space in the first area is greater than one, increasing the size of the second area.

12. The method of claim 10, further comprising:

recording a used parameter and a remaining parameter corresponding to the first area; and the step of dynamically determining the size of the second area according to the number of the egress queues that the input packet is forwarded to comprises:

dynamically determining the size of the second area according to the used parameter and the remaining parameter.

13. The method of claim 12, wherein the used parameter is the number of the input packets stored in the first area, the remaining parameter is a value generated by subtracting the number of the egress queues having the minimum guaranteed storage space in the first area from a predetermined value, and the step of dynamically determining the size of the second area according to the used parameter and the remaining parameter comprises:

obtaining the size of the second area by subtracting a summation of the used parameter and the remaining parameter from a total space.

14. The method of claim 13, further comprising:

when the input packet is forwarded to multiple egress queues, and N egress queues of the multiple egress queues have the minimum guaranteed storage space in the first area, adding one to the used parameter, and subtracts N from the remaining parameter.

15. The method of claim 10, further comprising:

when multiple egress queues corresponding to the input packet stored in the memory are sent out from a plurality of output ports of the switch, dynamically determining the size of the second area according to a number of the multiple egress queues.

16. The method of claim 15, wherein the step of dynamically determining the size of the second area according to the number of the multiple egress queues comprises:

when the multiple egress queues corresponding to the input packet stored in the memory are sent out from the plurality of output ports of the switch, if a number of the multiple egress queues which its memory usage is not over the corresponding minimum guaranteed space is greater than one, decreasing the size of the second area.

17. The method of claim 15, further comprising:

recording a used parameter and a remaining parameter corresponding to the first area, wherein the used parameter is the number of the input packets stored in the first area, the remaining parameter is a value generated by subtracting the number of the egress queues having the minimum guaranteed storage space in the first area from a predetermined value; and the step of dynamically determining the size of the second area according to the number of the multiple egress queues comprises:

obtaining the size of the second area by subtracting a summation of the used parameter and the remaining parameter from a total space.

18. The method of claim 10, wherein the plurality of egress queues are a plurality of logical queue/virtual queue.

* * * * *